(12) United States Patent
Butterfoss

(10) Patent No.: US 11,000,950 B2
(45) Date of Patent: May 11, 2021

(54) ROBOTIC MOTION PLANNING

(71) Applicant: X Development LLC, Mountain View, CA (US)

(72) Inventor: Ryan Butterfoss, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 296 days.

(21) Appl. No.: 15/995,431

(22) Filed: Jun. 1, 2018

(65) Prior Publication Data

US 2019/0366543 A1    Dec. 5, 2019

(51) Int. Cl.
*B25J 9/16*    (2006.01)

(52) U.S. Cl.
CPC ........... *B25J 9/1666* (2013.01); *B25J 9/1658* (2013.01); *B25J 9/1661* (2013.01)

(58) Field of Classification Search
CPC .......................................................... B25J 9/16
See application file for complete search history.

(56) References Cited

U.S. PATENT DOCUMENTS

| | | | |
|---|---|---|---|
| 5,347,459 A | 9/1994 | Greenspan et al. | |
| 5,434,489 A | 7/1995 | Cheng et al. | |
| 5,452,238 A | 9/1995 | Kramer et al. | |
| 5,499,320 A | 3/1996 | Backes et al. | |
| 6,004,016 A | 12/1999 | Spector | |
| 6,292,715 B1 | 9/2001 | Rongo | |
| 6,370,573 B1 | 4/2002 | Bowman-Amuah | |
| 6,470,225 B1 | 10/2002 | Yutkowitz | |
| 6,493,607 B1 | 12/2002 | Bourne et al. | |
| 6,804,580 B1 | 10/2004 | Stoddard et al. | |
| 9,649,764 B1 | 5/2017 | Sun et al. | |
| 2004/0149065 A1 | 8/2004 | Moran | |
| 2004/0254771 A1 | 12/2004 | Reiner et al. | |
| 2009/0312867 A1 | 12/2009 | Hasegawa et al. | |
| 2014/0278091 A1 | 9/2014 | Horvitz et al. | |

(Continued)

OTHER PUBLICATIONS

PCT International Search Report and Written Opinion in International Appln. No. PCT/US2019/34989, dated Aug. 16, 2019, 8 pages.

(Continued)

*Primary Examiner* — Kira Nguyen
(74) *Attorney, Agent, or Firm* — Fish & Richardson P.C.

(57) ABSTRACT

Systems, methods, devices, and other techniques are described for planning motions of one or more robots to perform at least one specified task. In some implementations, a task to execute with a robotic system using a tool is identified. A partially constrained pose is identified for the tool that is to apply during execution of the task. A set of possible constraints for the unconstrained pose parameter are selected for each unconstrained pose parameter. The sets of possible constraints are evaluated for the unconstrained pose parameters with respect to one or more task execution criteria. A nominal pose is determined for the tool based on a result of evaluating the sets of possible constraints for the unconstrained pose parameters with respect to the one or more task execution criteria. The robotic system is then directed to execute the task, including positioning the tool according to the nominal pose.

20 Claims, 7 Drawing Sheets

(56) References Cited

U.S. PATENT DOCUMENTS

2015/0127151 A1* 5/2015 Riedel .................... B25J 9/1643
                                                      700/250
2016/0023352 A1* 1/2016 Kennedy ................. B25J 5/005
                                                      700/259
2018/0173206 A1* 6/2018 Pollock ................... G06F 30/20

OTHER PUBLICATIONS

Araujo et al. "Hierarchical Scheduling of Robotic Assembly Operations in a Flexible Manufacturing System," Fifth International FAIM Conference, Jun. 1995, 12 pages.
Dean et al. "An Analysis of Time-Dependent Planning," AAAI, Aug. 1988, 6 pages.
Li et al. "A Review on Integrated Process Planning and Scheduling," Int. J. Manufacturing Research, vol. 5(2), Jan. 2010, 20 pages.
Martin et al. "Technology and Innovation for the Future of Production: Accelerating Value Creation," White paper, World Economic Forum, Mar. 2017, 38 pages.
Ruml et al. "On-line Planning and Scheduling: An Application to Controlling Modular Printers," Journal of Artificial Intelligence Research vol. 40, Feb. 2011, 54 pages.
Sun et al. "A Model-Driven Approach to Support Engineering Changes in Industrial Robotics Software," International Conference on Model Driven Engineering Languages and Systems, Sep. 2012, 15 pages.

* cited by examiner

ROBOTIC MOTION PLANNING

FIELD

This specification generally relates to robotics, and more particularly to motion planning systems.

BACKGROUND

Robotic systems have been used to automate a wide range of tasks, including tasks in industrial settings such as painting, assembly, picking and placing for printed circuit boards, package and labeling, palletizing, product inspection, and material handling. In some applications, one or more robots in a system are each configured to perform tasks within a shared workspace, and the robots are each capable of moving about the workspace in two or more axes.

SUMMARY

This specification generally describes systems, methods, devices, and other techniques for planning motions of one or more robots to perform at least one specified task. As an example, a planning module in a motion planning system can determine motions for a robot to perform a milling operation that advances a rotary cutter into an object at a certain direction to remove material from the object. The task (e.g., the milling operation) can be defined by a tool, e.g., a rotary cutter that is manipulated by the robotic system while executing the task.

The planning module can automate motion planning of the robotic system while executing the task and direct the robotic system according to the planned motion. The motion planning can be used to verify the feasibility of a task to be executed and solve under-constrained problems associated with the task without human intervention.

The planning module can initially receive an under constrained tool trajectory that represents an initial position of a tool prior to the start of the task and an expected position of the tool after execution of the task. The motion planning module can then identify a set of pose parameters that represent, for example, an expected trajectory of the tool during the task, or the types of motion involved in executing the task. The motion planning module can evaluate the pose parameters to identify a target nominal pose of the tool once the task has been executed. The target nominal pose of the tool is then used to identify a set of possible configurations for joints of the robotic system to enable motion that achieves the nominal pose of the tool. The planning module can then use heuristics to identify an optimal configuration for executing the task. The planning module can use cost function analysis to identify a specific configuration that achieves the nominal pose of the tool with the lowest cost to the robotic system. As an example, given a set of possible joint configurations, the planning tool may select the configuration that reduces the likelihood of a possible collision between joints.

In some instances, the planning module can identify a trust region associated with the target nominal pose of the tool after execution of the task. The size and area of the trust region can be defined by a tolerance range and a feasibility range. The tolerance range can represent an amount that the tool can deviate from the target nominal pose and still satisfy the requirements of a task. In some implementations, the tolerance range represents a specified degree of precision for execution of a task by the robotic system. As an example, the planning module may specify a small tolerance range from the nominal pose for high precision and a large tolerance range from the nominal pose for low precision tasks. The feasibility range can represent a range of motion in which the robotic system is expected to operate relative to the nominal pose.

As described throughout, the features and components of the system can provide various advantages. For example, the planning module of the system can implement techniques that provide improvements in the planning and execution of a task by a robotic system. The planning module can use planning techniques to solve problems associated with under constrained motion of a tool during execution of a task. These techniques can involve using heuristics to predict motion of the tool prior to task execution.

As another example, the system includes a kinematics module that is capable of identifying possible joint configurations that satisfy a nominal pose of a tool in association with a task to be executed. The kinematics module can use various indicators, such as heuristics, to identify the most suitable joint configuration from among the possible joint configurations for executing the task. In this manner, the system is capable of improving the execution of the task and potentially resolve issues relating to under constrained motion.

In some instances, the system can apply cost function analyses to identify, for instance, a joint configuration for the robotic system that is likely to impose the least amount of cost to the robotic system during task execution. In this regard, the planning module can identify and select an optimal trajectory for execution of the task by evaluating multiple possible joint configurations using certain task execution criteria as discussed below. In some implementations, a method can include the operations of: identifying, by a computing system, a task to execute with a robotic system using a tool; and identifying a partially constrained pose for the tool that is to apply during execution of the task, where the partially constrained pose defines constraints for a first subset of a plurality of pose parameters, and where the partially constrained pose excludes constraints for a second subset of the plurality of pose parameters, the second subset of the plurality of pose parameters being unconstrained pose parameters. The method also includes, for each unconstrained pose parameter, selecting a set of possible constraints for the unconstrained pose parameter; evaluating, by the computing system, the sets of possible constraints for the unconstrained pose parameters with respect to one or more task execution criteria; determining, by the computing system, a nominal pose for the tool associated with the task based on a result of evaluating the sets of possible constraints for the unconstrained pose parameters with respect to the one or more task execution criteria, the nominal pose for the tool defining constraints for each of the plurality of pose parameters; and directing, by the computing system, the robotic system to execute the task, including positioning the tool according to the nominal pose.

One or more implementations of the device may include the following optional features. For example, in some implementations, the plurality of pose parameters include respective parameters representing a different degree of freedom for a position or an orientation of the tool.

In some implementations, the one or more task execution criteria includes factors in a cost-function analysis for execution of the task by the robotic system.

In some implementations, the method further includes: determining a configuration for a plurality of joints of the robotic system based on the target nominal pose for the tool associated with the task, where directing the robotic system to execute the task includes directing the robotic system to execute the task, including positioning the tool according to the configuration for the plurality of joints of the robotic system.

In some implementations, determining the configuration for the plurality of joints of the robotic system includes: identifying, based on the task for execution by the robotic system, (i) a first subset of the plurality of joints that each represent functional joints and (ii) a second subset of the plurality of joints that each represent non-functional joints; identifying a plurality of fully constrained poses for the tool based on the first subset of the plurality of joints that each represent functional joints; identifying a plurality of fully constrained joint configurations for the second subset of the plurality of joints that each represent non-functional joints; and determining the configuration for the plurality of joints of the robotic system based on combining the plurality of fully constrained poses for the tool and the plurality of fully constrained join configurations for the second subset of the plurality of joints that each represent non-functional joints.

In some implementations, determining the configuration for the plurality of joints of the robotic system includes determining a plurality of possible joint configurations for the plurality of joints of the robotic system based on combining the plurality of fully constrained poses for the tool and the plurality of fully constrained join configurations for the second subset of the plurality of joints that each represent non-functional joints.

In some implementations, the method further includes the operations of: evaluating each possible joint configuration included in the plurality of possible joint configurations with respect to a likelihood that execution of the task according to a particular joint configuration will result in a collision with one or more components of the robotic system; and selecting a particular possible joint configuration from among the plurality of possible joint configurations based on the evaluation of each possible joint configuration included in the plurality of possible joint configurations with respect to a likelihood that execution of the task according to a particular joint configuration will result in a collision with one or more components of the robotic system.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference numbers and designations in the various drawings indicate like elements. The components shown here, their connections and relationships, and their functions, are meant to be exemplary only, and are not meant to limit the implementations described and/or claimed in this document.

DETAILED DESCRIPTION

In general, this specification describes systems, methods, devices, and other techniques for planning motion of one or more robots to improve the positioning and placement of one or more tools carried by the robot that exhibits under constrained motion. A system can include a planning module that is capable of automating the execution of a task by a robotic system. As an example, the task can be a milling operation that advances a rotary cutter into an object at a certain direction to remove material from the object. The task can be defined by a tool, e.g., a rotary cutter that is manipulated by the robotic system while executing the task.

Figure 1:
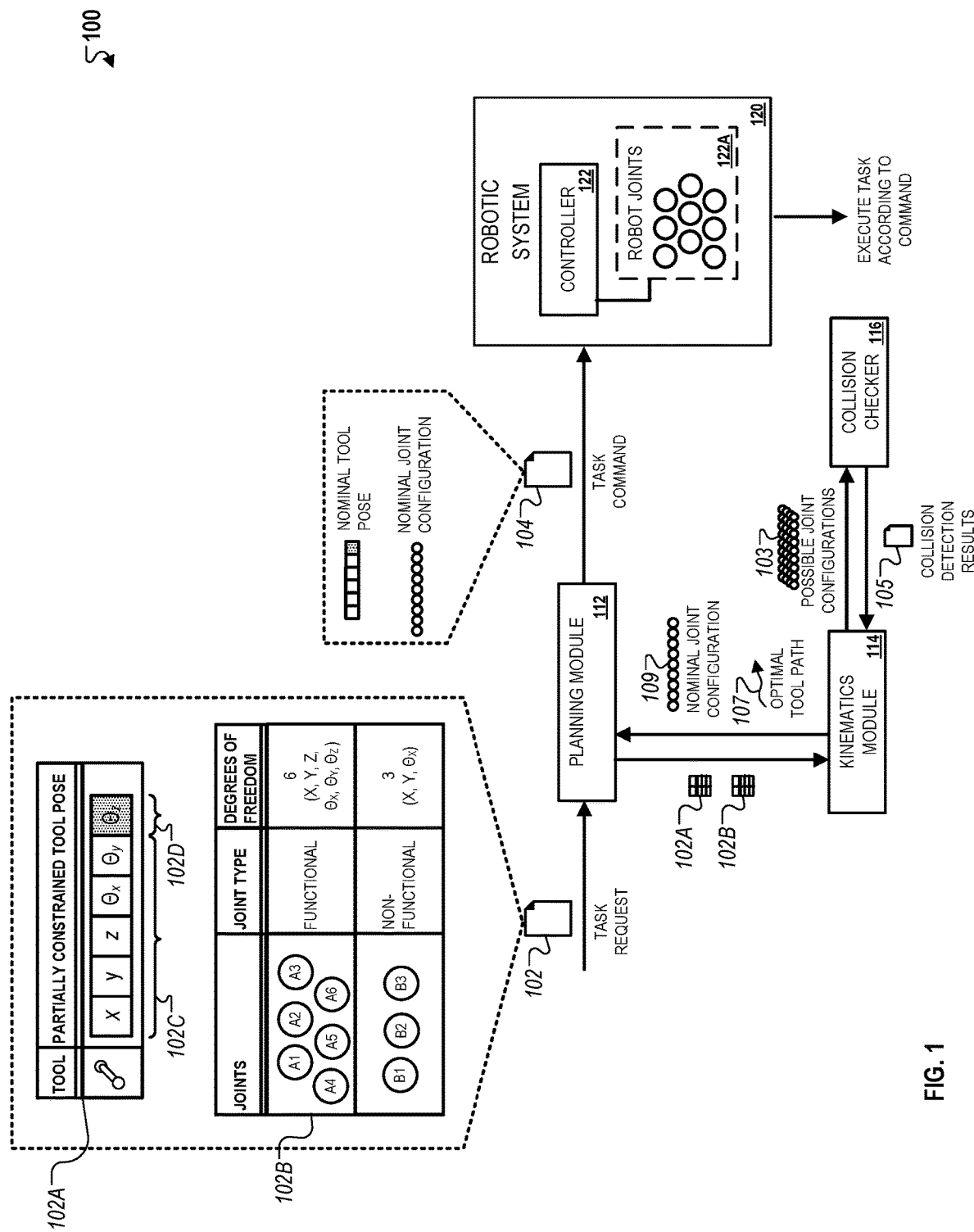
FIG. 1 illustrates an example of a motion planning system.

FIG. 1 illustrates an example of a motion planning system 100. The system 100 can include a motion planning module 112, a kinematics module 114, a collision checker 116, and a robotic system 120. In the example depicted in FIG. 1, the system 100 generates a command to automate the execution of a task by the robotic system 120 based on a target pose of a tool to be manipulated during execution of the task.

Referring briefly to the process depicted in FIG. 1, the planning module 112 initially receives a task request 102 that identifies a nominal pose 102A for the tool and joint information 102B for the robotic system 120. The kinematics module 114 and the collision checker 116 process the data included in the task request 102 to identify an optimal tool path 107, a nominal tool pose for the tool, and a nominal joint configuration 109 for the robotic system 120. The planning module 112 generates a task command 104 based on the output of the kinematics module 114 and the collision checker 116. The task command 104 is provided to a controller 122 of the robotic system 120, which then directs the robotic system 120 to perform the task according to the task command 104.

Referring now to the components of the system 100, the planning module 112, the kinematics module 114, and the collision checker 116 can be software modules that are executed on a variety of computing devices. For example, the planning module 112, the kinematics module 114, and the collision checker 116 can be implemented on a computing device that is located in the same facility as the robotic system 120. The computing device can be a general purpose computer that is configured to exchange communications with the controller 122, or alternatively, a special purpose computer that is specifically manufactured to operate with the robotic system 120. In other examples, the computing device can be server system that is remote from the facility where the robotic system 120 is located and configured to exchange communications with the controller 122 of the robotic system through a network medium such as the Internet or an intranet associated with the facility of the robotic system 120.

The robotic system 120 can be an industrial robot with programmable logic that is used to adjust robot joints 122A of the robotic system 120 to permit automated task execution. In some implementations, the robotic system 120 includes multiple robots. The controller 122 can receive instructions to configure the robot joints 122A to enable specified types of movement. For example, the robotic system 120 can be a robotic arm with links that attached at joints to permit movement along six degrees of freedom.

The robotic system 120 can engage tools to perform certain tasks, such as moving the tool to a specified coordinate location along a certain trajectory, rotating a tool relative to a certain axis, attaching two tools together, aligning a tool relative to a reference plane, among others.

The planning module 112, the kinematics module 114, and the collision checker 116 can be implemented to be logically distinct, e.g., executed as independently operating software, and/or physically distinct, e.g., implemented on different computing systems. For example, the planning module 112 can be executed on a computing device that is located in the same facility as the robotic system 120 whereas the kinematics module 114 and the collision checker 116 can be executed on a server system in a separate location.

The robotic system 120 can be configured to execute functional and non-functional motions when executing a task. Functional motions refer to motion in which a tool is engaged and the position of the tool is monitored relative to a target position. For example, tasks that involve moving a tool or aligning the tool represent functional motions. Non-functional motion refers to joint space point-to-point motion that does not involve engaging a tool. For example, motion of the robotic system 120 to a starting point prior to initiating the task represents non-functional motion.

Joints of the robotic system 120 that are moved during a functional motion can represent functional joints. During a functional move, functional joints of the robotic system 120 are moved while non-functional joints remain stationary. For example, joints of a base of a robotic arm remain stationary while joints on the robotic arm are moved to execute a milling task.

The joints of the robotic system 120 can be static or dynamic in various implementations. In some implementations, the joints of the robotic system 120 are static such that they are always designated as representing a functional joint or a non-functional joint regardless of the task to be performed by the robotic system 120. For example, joints on a robot arm can be always designated as functional joints whereas joints on the base of the robot arm can be designated always designated as non-functional joints. In other implementations, joints of the robotic system 120 are dynamic such that their designation as representing either a functional joint or a non-functional joint is dependent on the type of task to be performed by the robotic system 120. For example, base joints can be designated as functional joints when all relevant tolerances are loose enough above a specified threshold, and designated as non-functional joints otherwise.

Referring now to the technique depicted in FIG. 1, the planning module 112 initially receives a task request 102. The task request 102 identifies a nominal pose 102A for a tool to be engaged by the robotic system 120 during the task, and joint information 102B for the robot joints 122A of the robotic system 120.

The pose 102A can represent under constrained motion of the tool during execution of the test. The pose 102A can be represented as a set of pose parameters, which includes constrained pose parameters 102E and one or more unconstrained pose parameters 102D. In the example shown in FIG. 1, the constrained pose parameters 102C indicate that the tool is constrained with respect to movement along the x, y, and z axis and rotation along the x and y axis. Additionally, the unconstrained pose parameters 102D indicate that the tool is not constrained with respect to rotation along the z axis. In some instances, the set of pose parameters can also include pose parameters identifying tolerance ranges for motion along each degree of freedom (DoF) as discussed below in reference to FIGS. 2A and 2B.

The joint information 102B identifies the number of joints and joint classification for each joint and the degrees of freedom. In the example shown in FIG. 1, the robotic system 120 includes nine joints. Six joints A1-A6 are located on a robotic arm and three joints B1-B3 are located on a base station beneath the robotic arm. As discussed above, joints A1-A6 are functional joints since they can be used to perform functional motions that involve engaging a tool, and joints B1-B3 are non-functional joints since they are not used in functional motion. In this example, joints A1-A6 have six degrees of freedom (e.g., they are configured for movement and rotation along three axis) whereas joints B1-B3 have three degrees of freedom (e.g., they are configured for movement along "x" and "y" axis and horizontal rotation).

The kinematics module 114 processes the nominal pose 102A and the joint information 102B to identify a set of possible joint configurations 103. The process of identifying the set of possible joint configurations 103 is discussed in detail in FIG. 3. Each joint configuration in the set of joint configurations 103 can represent an alternative configuration for the robot joints 122A of the robotic system 120 given their respective degrees of freedom and the target pose of the tool after the task has been executed.

The kinematics module 114 can use algorithmic techniques to identify information associated with the set of possible joint configurations 103. For example, the kinematics module can include a "Solve" algorithm that accepts the nominal pose 102A and the joint information 102B as input and generates the set of possible configurations 103 based on the input.

As another example, the kinematic module 114 can include a "SolvePartial" algorithm that additionally passes fixed values for one or more joints of the robot joints 122A. Using this algorithm, the kinematic module 114 samples only the controller null space since the actuator null space is empty, such as when base joints are fixed for functional moves.

As yet another example, the kinematic module 114 can include a "SolveAround" algorithm that can be used to identify joint configurations that are similar to the set of joint configurations 103. These joint configurations can be used by the robotic system 120 to simply the motion of the robotic system 120 while executing the task. For example, a task can involve two motions to be performed sequentially. In this example, a set of possible joint configurations (and similar configurations) can be associated with each motion. Once the robotic system 120 has completed the first motion, the robotic system 120 can search the set of similar configurations that are associated with the second motion to identify the next joint configuration. In this example, because each motion is associated with a finite set of joint configurations, the robotic system 120 can quickly filter the set of joint configurations and select the most appropriate joint configuration.

The collision checker 116 evaluates the set of possible joint configurations 103 and estimates the likelihood that executing the task with a particular joint configuration will result in a collision. For example, the collision checker 116 can correlate anticipated motion trajectories for multiple joints of the robotic system 120 to determine that two components of a robotic arm of the robotic system 120 are likely to collide with each other. As another example, the collision checker 116 can evaluate motion trajectories of joints to determine whether a component of the robotic system 120 is likely to collide an object surrounding the robot such as a structure associated with the tool engaged during the task. Collision detection results 105 are provided to the kinematics module 114 and used to identify a nominal joint configuration 109 from among the possible joint configurations 103. Collision detection is discussed below in detail in reference to FIG. 4.

The planning module 112 receives data generated by the kinematics module 114 and the collision checker 116 to generate the task command 104. The task command 104 identifies a nominal tool pose, which represents an expected or target pose for the tool once the robotic system 120 has executed the task. The task command 104 is provided to the controller 122 to direct the robot joints 122A according to the nominal joint configuration and execute the task according to planned motion (e.g., nominal pose of the tool).

Figure 2A:
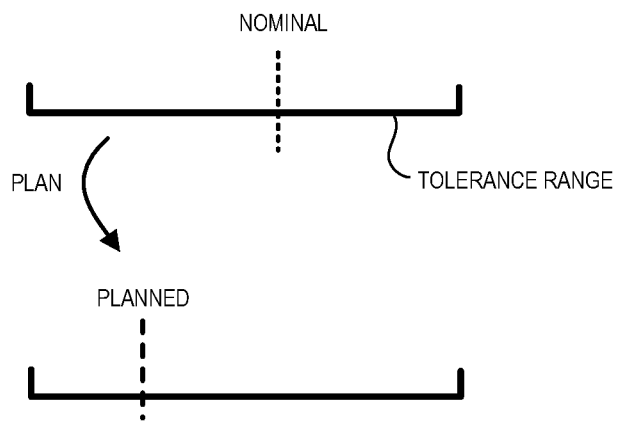
FIGS. 2A and 2B illustrate examples of motion ranges for a motion planning system.
Figure 2B:
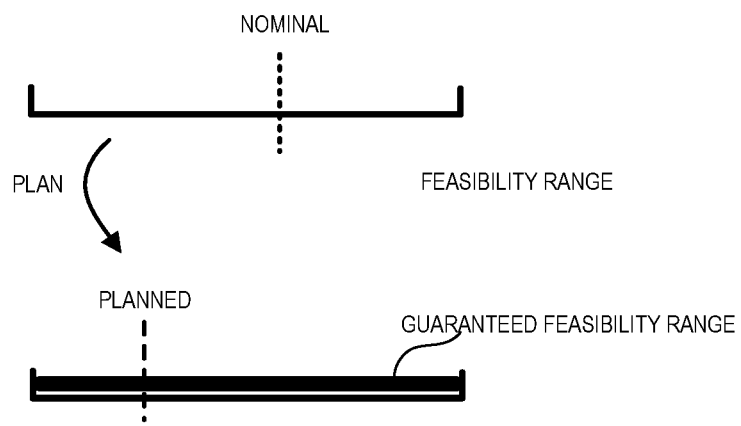

FIGS. 2A and 2B illustrate examples of motion ranges for a motion planning system. Referring initially to FIG. 2A, an example of a tolerance range for a nominal pose is depicted. As discussed above, a nominal pose for a tool defines the expected or target pose after the robotic system 120 executes a task. The planning module 112 uses the nominal pose of the tool and the nominal joint configuration to plan the motion of the robot joints while the robotic system 120 executes the task according to the planned motion.

As shown in FIG. 2A, the planning module 112 plans motion based on a tolerance range around the nominal pose for the tool. The tolerance range defines an acceptable range in which a position controlled DoF can still satisfy task requirements as specified within the task request 102. For example, free rotation around a nozzle for a gluing task can be expressed as a single tolerance range $[-\pi, \pi]$ on $\theta_z$. In another example, an angle grinder may specify two ranges $\{[0, 0], [-\pi, \pi]\}$ to indicate a mirror symmetry of the tool.

The tolerance range can be used to define a range of motion that produces that pose that might not be exactly the nominal pose but is close enough to satisfy task requirements. For instance, while the nominal value for a sensor controlled DoF is the expected position of the DoF based on a nominal model, this nominal value is often unlikely to ever be exactly executed by the controller 122 of the robotic system 120. The tolerance range therefore permits the controller 122 to execute a value that is different from the nominal value but still achieve a successful result.

The tolerance range can also be used to indicate a desired precision with which a task should be executed. For example, a larger tolerance range can be used with tasks that require lower precision, thereby allowing the controller 122 to execute a broader range of motion while still satisfying the task requirements. As another example, a smaller tolerance range can be used with tasks that require higher precision, thereby requiring a narrower range of motion to successfully satisfy the task requirements.

Referring now to FIG. 2B, an example of a feasibility range is depicted. A feasibility range defines a range in which a sensor controlled DoF is expected to operate relative to the nominal pose. To ensure that the planning module 112 can effectively plan motion for executing the task, a pose tool is expected to be within the feasibility range. For example, a force controlled DoF following a surface with a 0.001 m precision (based on property of the surface), the tool is expected to stay between a feasibility range defined by −0.001 m and 0.001 m. Thus, the planning module 112 ensures that a single feasible solution exists within the tolerance range whereas it also ensures that the a substantial or whole portion of the feasibility range is feasible for execution.

Figure 3:
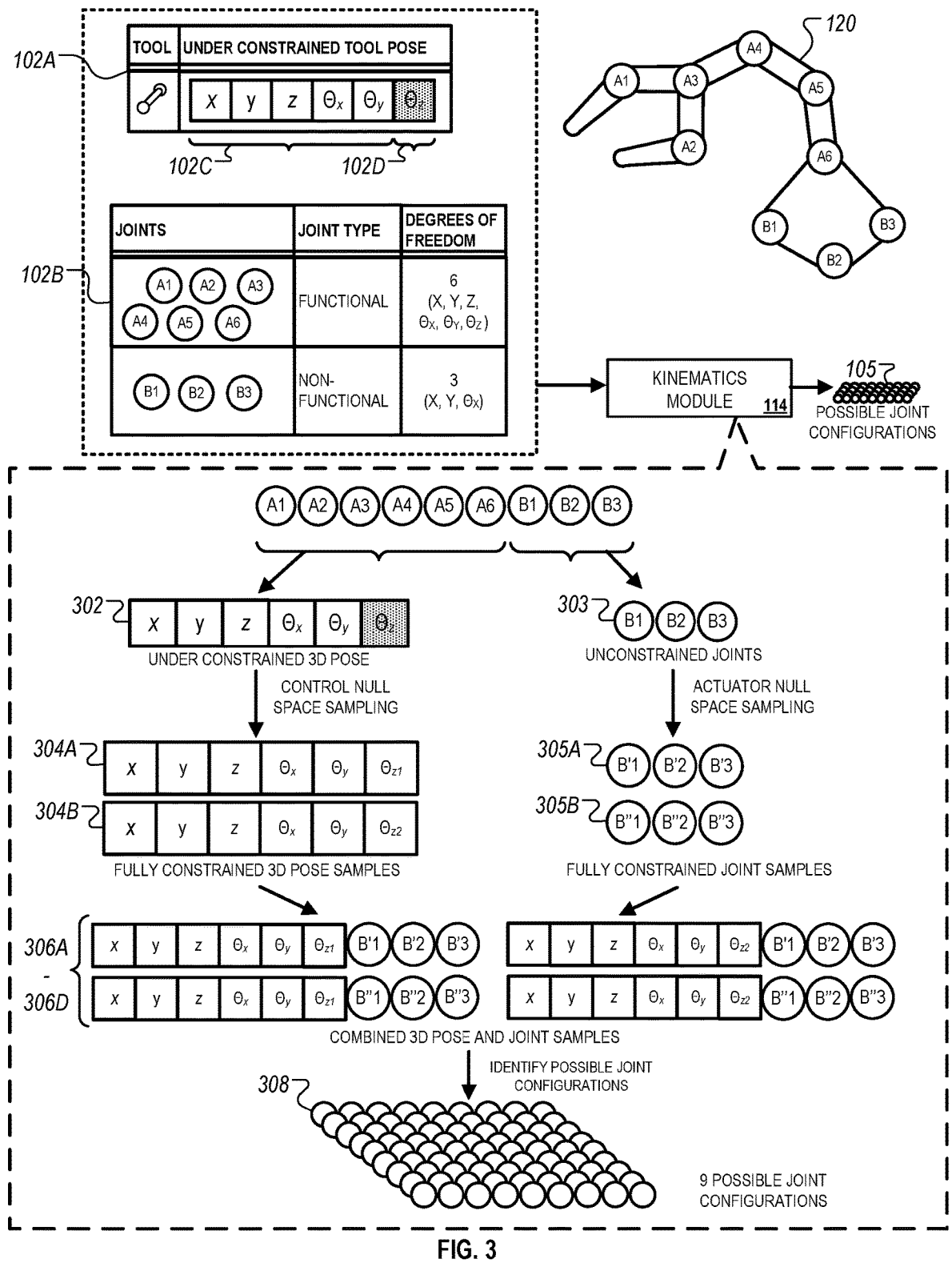
FIG. 3 illustrates an example of a technique for determining joint configurations for a robotic system to execute a task with a tool.

FIG. 3 illustrates an example of a technique for determining joint configurations for a robotic system to execute a task with a tool. In the example, the kinematics module 114 identifies a set of possible joint configurations 103 for a robotic system 120 when performing a task. As discussed above in reference to FIG. 1, the set of possible joint configurations 103 is determined based on the nominal pose 102A for the tool to be engaged by the robotic system 120 and the joint information 102B for robot joints of the robotic system 120.

As shown in FIG. 3, the kinematics module 114 processes functional joints (e.g., joints A1-A6) in a different manner than non-functional joints (e.g., joints B1-B3). This is because, as discussed above, during functional motions, non-functional joints are locked such that only the functional joints are moved to according to planned motion.

In the example depicted in FIG. 3, the kinematics module 114 uses a "Solve" algorithm to identify a set of possible joint configurations that allows the robotic system 120 to achieve the nominal pose 102A for the tool. The kinematics module 114 initially determines an under constrained three-dimensional pose 302 for functional joints (e.g., joints A1-A6) that have six DoF. The kinematics module 114 then generates fully constrained three-dimensional pose samples 304A and 304B by sampling the control null space of the under constrained DoF (e.g., $\Theta_z$). In parallel, the kinematics module 114 also identifies unconstrained joints 303 (e.g., joints B1-B3) with three DoFs and samples the actuator null space of the unconstrained joints 303 to generate fully constrained joint samples 305A and 305B. The pose samples 304A and 304B and the joint samples 305A and 305B are then combined to generate possible control/actuator sample combinations 306A, 306B, 306C, and 306D. The kinematics module 114 then identifies all possible joint configurations for the control/actuator sample combinations 306A-D.

Figure 4:
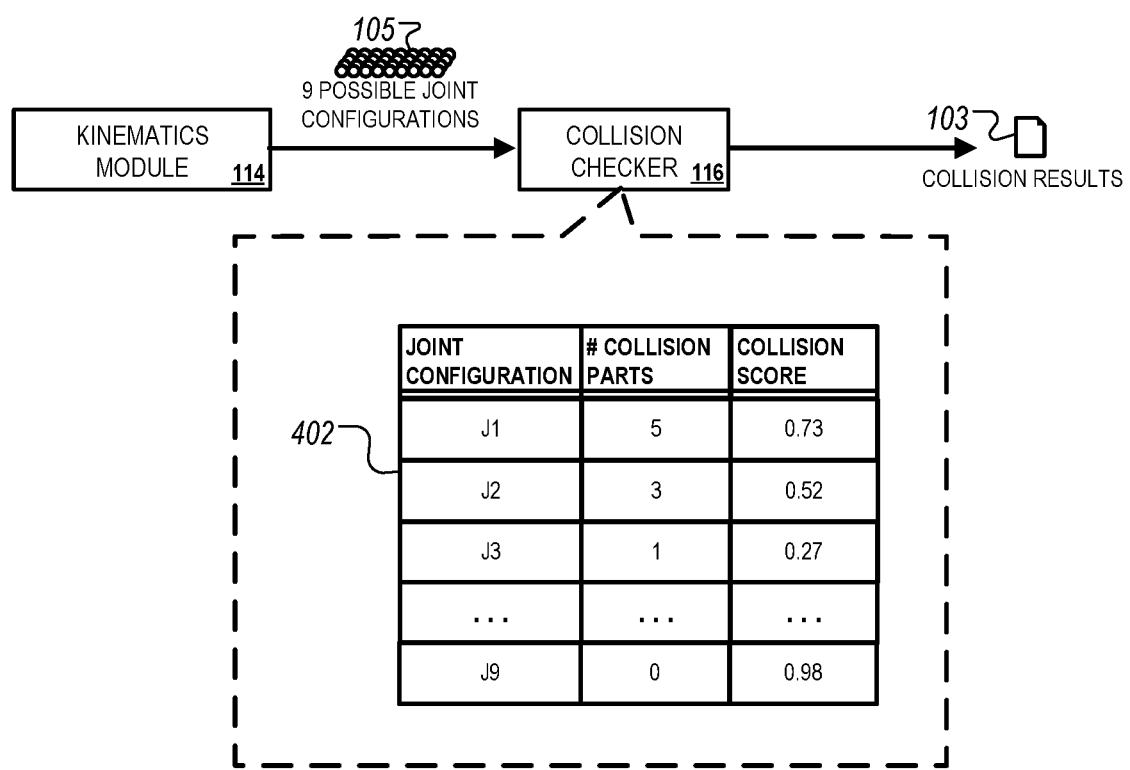
FIG. 4 illustrates an example of a technique for predicting the likelihood of a collision occurring for possible joint configurations of a robotic system.

FIG. 4 illustrates an example of a technique for predicting the likelihood of a collision occurring for possible joint configurations of the robotic system 120. In the example, the collision checker 116 receives data indicating the possible joint configurations 103 for the joints of the robotic system 120 as discussed above in reference to FIG. 1. The collision checker 116 evaluates motion trajectories associated with each of the possible joint configurations to determine a likelihood of a collision occurring. For example, the collision checker can evaluate the motion of each component of the robotic system 120 and determine, for instance, if two components come in close proximity with one another during task execution, if a component comes in close proximity with an object in the environment surrounding the robotic system 120, or if the tool engaged by the robotic system 120 comes into close proximity with an object and/or a component of the robotic system 120.

In addition, the collision checker 116 can distinguish between collisions that are acceptable (e.g., collisions that are expected during a task because the motion involved is the attachment of a tool to another object). In such instances, the collision checker 116 identifies functional collision body pairs that represent bodies associated with an acceptable collision. For example, a tool used for milling can represent an object that is included in a functional collision body pair. In some instances, the collision checker 116 is configured to dynamically determine whether a collision for a particular tool or component is permissible in relation different types of motions that are being performed throughout the execution of the task. For example, a tool used for cutting can be permitted to collide with another component when the robotic system 120 performs a cutting operation, but not permitted to collide when the robotic system performing any other action that is not a cutting operation. In this example, the collision checker 116 may disregard possible collisions during cutting operations since they are permissible, but identify possible collisions during other times when the robotic system 120 is not performing a cutting operation.

In the example depicted in FIG. 4, the collision checker 116 generates a table 402 that identifies, for each joint configuration, a number of components that are likely to have a possibility of being involved in a collision and a collision score representing a predicted likelihood that the applying the joint configuration will result in at least one impermissible collision during execution of the task. As discussed above, the collision checker 116 can compute the collision scores such that only the possibility of impermissible collisions (and not permissible collisions) are factored in the computation of the collision scores.

As shown in FIG. 4, of the nine possible joint configurations included in the set of possible joint configurations 103, joint configuration J9 is determined to have the highest likelihood of at least one impermissible collision occurring during execution of the task using that joint configuration because the collision checker 116 determines that its collision score has a value of "0.98." In this example, the planning module 112 uses this information in the collision detection results 105 to reduce the likelihood that joint configuration J9 is selected as the nominal joint configuration that is referenced in the task command 104 provided to the controller 122.

Figure 5:
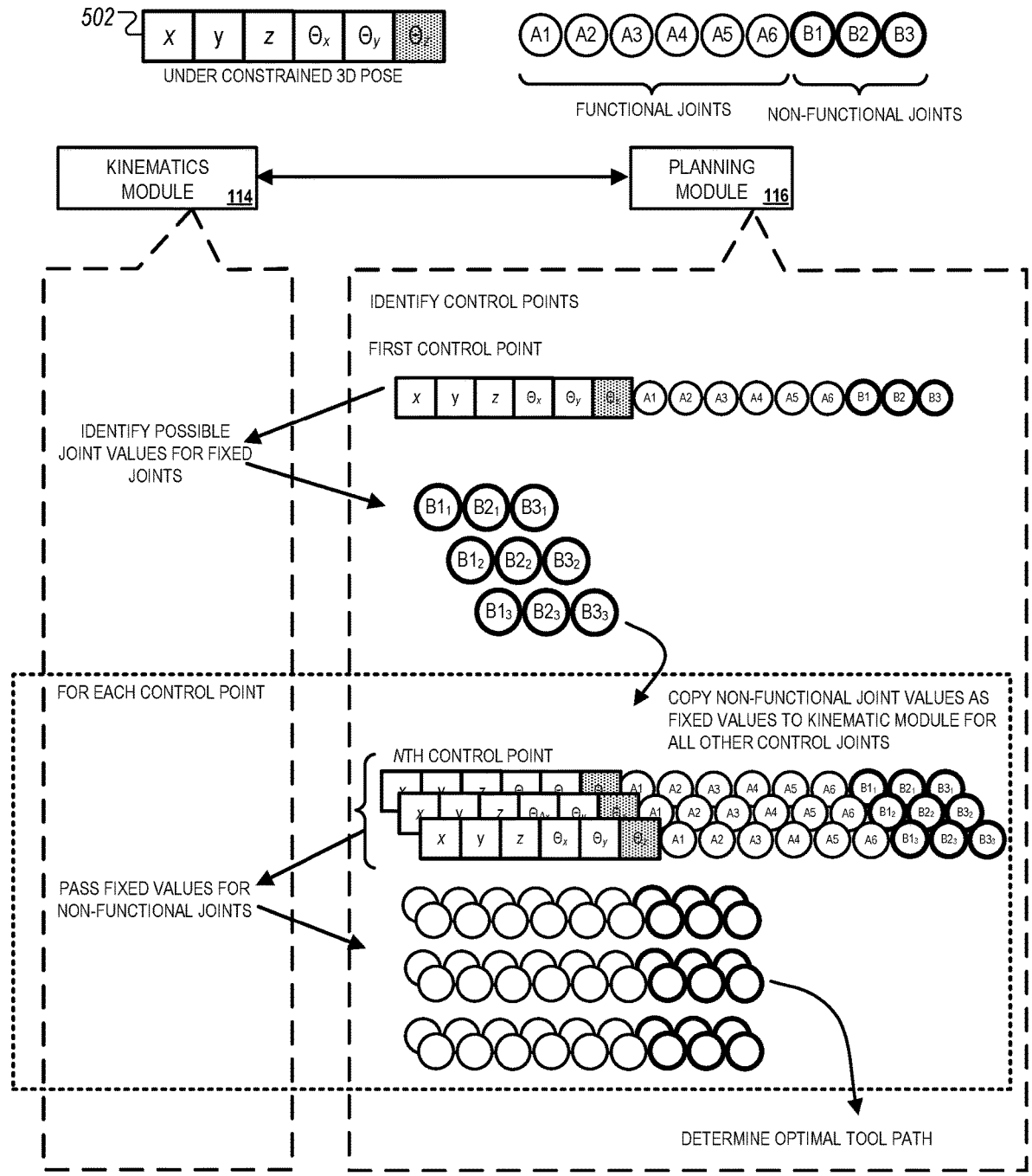
FIG. 5 illustrates an example of a technique for predicting an optimal trajectory for a robotic system to execute a task with a tool.

FIG. 5 illustrates an example of a technique predicting an optimal trajectory for a robotic system to execute a task with a tool. In the example, the planning module 112 applies a "SolvePath" algorithm that is configured to identify possible trajectories for joint configurations. A trajectory refers to a continuous section of control points that represent motion of the robotic system 120 when performing a task according to a specified joint configuration. For example, if a trajectory is defined by three control points, then the robotic system 120 moves from the first control point to the second control point and then finally to the third control point in executing a specified task. Because the execution of a task can involve multiple possible trajectories, the technique depicted in FIG. 5 can be applied by the kinematic module 114 and the planning module 112 to identify a joint configuration that, for instance, minimizes joint motion between control points (and therefore minimizes unnecessary movement by the robotic system 120).

The planning module 112 identifies control points for the task based on the joint information for the robotic system 120 (e.g., total number of joints, number of functional joints, and number of non-functional joints). For example, the control points can be determined based on the number of joint movements that are required to perform a specified task. The kinematic module 114 and the planning module 112 then evaluate identify possible joint configurations at each control point and then identify an optimal path by determining the path that has the least amount of joint motion between consecutive control points. For example, if the planning module 112 identifies two control points that each have two possible joint configurations, then there are a total of four paths with the different possible joint configurations (e.g., four possible joint configurations). In this example, the kinematic module 114 evaluates joint motion that is predicted to occur with each joint configuration and then determines the optimal path based on the joint configuration.

In the example depicted in FIG. 5, the kinematic module 114 and the planning module 112 identifies an optimal trajectory based on an under constrained three-dimensional pose 502 for a tool to be engaged and joint information for the robotic system 120. In this example, the robotic system 120 has nine joints, including a set of functional joints (e.g., joints A1-A6) and a set of non-functional joints (e.g., joints B1-B3). As discussed above, functional joints refer to joints that are moved in relation functional motion of a tool engaged during a task and non-functional joints refer to joints that remain stationary during execution of the task. Because the non-functional joints are not moved in relation to the nominal pose, the kinematic module 114 identifies and evaluates possible joint configurations for the non-fixed joints using the technique depicted in FIG. 5.

In some implementations, the robotic system 120 only has functional joints that are moved during functional motions associated with execution of a task. In such implementations, the kinematics module 114 identifies a set of possible joint configurations that satisfy an under constrained pose 502 for the tool. The pose 502 represents constraints on movement of the tool during execution of the task. For instance, the pose 502 specifies a set of constrained parameters that represent constrained movement (e.g., x, y, z, $\theta_x$, $\theta_y$) and an under constrained parameter that represents under constrained movement (e.g., $\theta_z$). In this example, motion of the tool to be engaged by the robotic system 120 is constrained along all axis except for rotation around the z axis. In such implementations, the optimal path is calculated as the path that minimizes joint motion between consecutive points.

In other implementations, such as the example depicted in FIG. 5, where robotic system 120 has non-functional joints, the system assigns joint values to non-functional joints in the manner as shown in FIG. 5. This technique can be repeated for each control point to identify an optimal trajectory of joint configurations that minimizes joint motion between control points.

As shown in FIG. 5, the kinematic module 114 identifies possible joint configurations for non-functional at the first control point of the task using a similar technique as discussed previously with respect to FIG. 3. The non-functional joint is then assigned fixed values based on the possible joint configurations. In the example depicted in FIG. 5, the kinematics module 114 identifies three possible joint configurations for joints B1-B3 and then assigns fixed values for each of the three possible joint configurations. This process is then repeated for all of the remaining control points so that the fixed joint values for the non-functional joints are copied to the other control points. The optimal path is calculated as the path with the greatest number of control points that can be executed using the same set of non-functional joint values.

Figure 6:
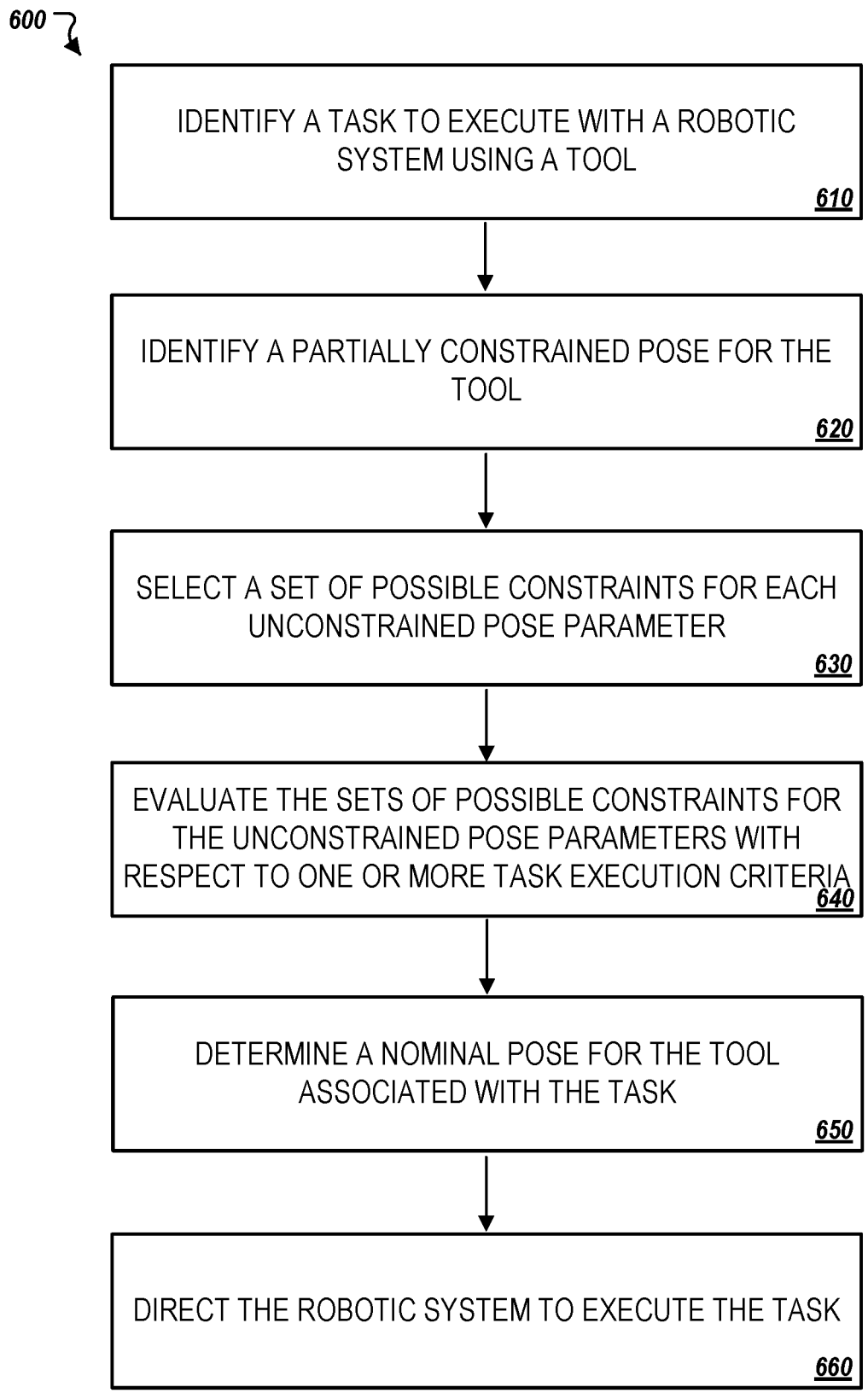
FIG. 6 illustrates an example of a process for automating the execution of a task by a robotic system.

FIG. 6 illustrates an example of a process 600 for automating the execution of a task by a robotic system. Briefly, the process 600 can include the operations of identifying a task for execution by a robotic system (610), identifying a partially constrained pose for the tool (620), selecting a set of possible constraints for each unconstrained pose parameter (630), evaluating the sets of possible constraints for the unconstrained pose parameters with respect to one or more task execution criteria (640), determining a nominal pose for the tool associated with the task (650), and directing the robotic system to execute the task (660).

The process 600 is generally described below in reference to FIG. 1 although any motion planning system that includes an industrial robot can be capable of executing the operations of the process 600. Additionally, one or more of the operations of the process 600 can be executed by a computing system associated with a robotic system, or alternatively, by a server system that is housed separately from the facility in which the system is located. As an example, the operations of the process 600 can be performed by the system 100, which can be implemented on a central server system that is exchanges data communications with the robotic system 120 over any suitable network medium. As another example, the operations of the process 600 can be performed by software running on a system that is configured to specifically control the robotic system 120 and is housed in the same facility as the robotic system 120.

In more detail, the process 600 can include the operation of identifying a task for execution by a robotic system (610). For example, the planning module 112 can identify a task to execute with the robotic system 120 using a tool. As discussed above, the task can represent different types of industrial operations that are performed by the robotic system 120, such as a milling operation that advances a rotary cutter into an object at a certain direction to remove material from the object. The planning module 112 can identify the task based on processing the task request 102 to identify the tool to be engaged by the robotic system 120.

The process 600 can include the operation of identifying a partially constrained pose for the tool (620). For example, the planning module 112 can identify a partially constrained pose 102A for a tool that is to apply during execution of the task. As discussed above in reference to FIG. 1, the pose 102A can define constraints for a set of pose parameters 102C that represent constrained motion for the tool during execution of the task. The pose 102A can also include one or more undefined pose parameters that represent unconstrained motion for the tool during execution of the task. For example, if motion of the tool is constrained in all DoF except for rotation about the z axis, then the pose parameters 102C can include pose parameters that represent motion along the x, y and z axis, and pose parameters that represent rotation along the x and y axis. In this example, the pose parameters 102D includes a single pose parameter for the z axis that is undefined to represent unconstrained rotation along the z axis.

The process 600 can include the operation of selecting a set of possible constraints for each unconstrained pose parameter (630). For example, the kinematics module 114 can control null space sampling to identify possible constraints for each unconstrained pose parameter within the pose 102A. In the example depicted in FIG. 3, the kinematics module 114 can generate constraints for the pose parameter 120D, which represents an unconstrained pose parameter.

The process 600 can include the operation of evaluating the sets of possible constraints for the unconstrained pose parameters with respect to one or more task execution criteria (640). For example, the kinematics module 114 can evaluate the sets of possible constraints for the unconstrained pose parameters with respect to certain task execution criteria associated with the task. The task execution criteria can identify, for example, an acceptable tolerance range surrounding the target location of a tool, a feasibility range under which the robotic system 120 is configured to operate, or a degree of precision for executing the task. Other examples of task execution criteria involve applying a cost function to identify a maximum amount of joint motion for executing the task, an amount of energy to be used in executing the task, among others.

The process 600 can include the operation of determining a nominal pose for the tool associated with the task (650). For example, the planning module 112 can identify a nominal pose for the tool based on a result of evaluating the sets of possible constraints for the unconstrained pose parameters with respect to the one or more task execution criteria. As discussed above, the nominal pose defines the expected or target pose of the tool after the robotic system 120 executes a task. The nominal pose of the tool can be used to identify nominal joint configurations for joints of the robotic system 120 in order to plan motion of the robotic system 120 while executing the task. For example, as discussed above in reference to FIG. 3, the nominal pose 102A and joint information 102B can be processed in parallel to identify the set of possible joint configurations 308 using a control null sampling technique by generating fully constrained three-dimensional pose samples and combining them with fully constrained joint samples.

The process 600 can include the operation of directing the robotic system to execute the task (660). For example, the planning module 112 can generate the task command 104 to identify a nominal pose of the tool and a nominal joint configuration for joints 122A of the robotic system 120. The task command 104 can be provided to the controller 122 to direct the robotic system 120 to execute the task and position the tool according to the nominal pose.

Figure 7:
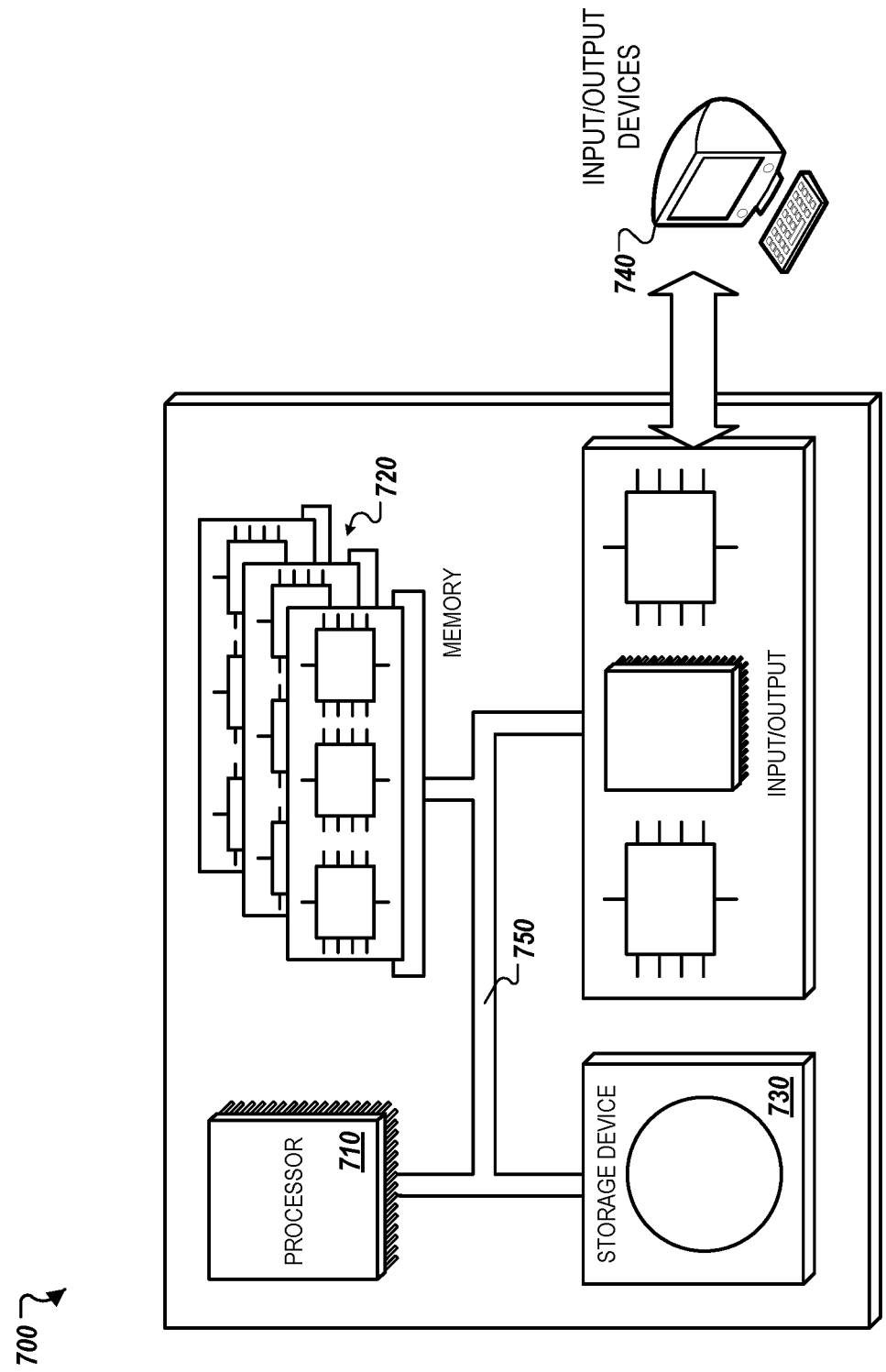
FIG. 7 illustrates a schematic diagram of a computer system that may be applied to any of the computer-implemented methods and other techniques described herein.

FIG. 7 is a schematic diagram of a computer system 700. The system 700 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., system 700) and their structural equivalents, or in combinations of one or more of them.

The system 700 is intended to include various forms of digital computers, such as laptops, desktops, workstations, personal digital assistants, servers, blade servers, mainframes, and other appropriate computers, including vehicles installed on base units or pod units of modular vehicles. The system 700 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 700 includes a processor 710, a memory 720, a storage device 730, and an input/output device 740. Each of the components 710, 720, 730, and 740 are interconnected using a system bus 740. The processor 710 is configured to process instructions for execution within the system 700. The processor may be designed using any of a number of architectures. For example, the processor 710 may be a CISC (Complex Instruction Set Computers) processor, a RISC (Reduced Instruction Set Computer) processor, or a MISC (Minimal Instruction Set Computer) processor.

In one implementation, the processor 710 is a single-threaded processor. In another implementation, the processor 710 is a multi-threaded processor. The processor 710 is configured to process instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is configured to provide mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method, comprising:
identifying, by a computing system, a task to execute with a robotic system using a tool, wherein the robotic system comprises a plurality of components connected by non-functional joints and functional joints;
identifying a target pose to be obtained by the tool during execution of the task;
generating a plurality of partial joint configurations, each partial joint configuration including respective non-functional joint values for the plurality of non-functional joints;
generating a plurality of complete joint configurations for each partial joint configuration of the plurality of partial joint configurations, including generating, for each partial joint configuration, a plurality of functional joint values for the functional joints that cause the tool to attain the target pose when the non-functional joints are fixed according to the corresponding partial joint configuration;
evaluating, by the computing system, the plurality of complete joint configurations with respect to one or more task execution criteria to select a complete joint configuration; and
directing, by the computing system, the robotic system to execute the task, including positioning the tool at the target pose according to the selected complete joint configuration.

2. The method of claim 1, further comprising:
evaluating each complete joint configuration according to a collision checking process to compute a likelihood that execution of the task according to the complete joint configuration will result in a collision with one or more components of the robotic system.

3. The method of claim 1, wherein positioning the tool at the target pose comprises:
performing a first movement of the non-functional joints according to non-functional joint values of a particular partial joint configuration; and
performing a second movement of the functional joints according to functional joint values of the selected complete joint configuration.

4. The method of claim 3, wherein performing the second movement of the functional joints comprises holding the non-functional joints fixed after performing the first movement.

5. The method of claim 1, further comprising:
generating a plurality of sets of complete joint configurations for each of a plurality of control points; and
evaluating a plurality of paths through respective complete joint configurations for the plurality of control points including counting how many control points are reachable from a same set of non-functional joint values.

6. The method of claim 1, wherein the target pose has an underconstrained value, and wherein generating the plurality of complete joint configurations comprises generating complete joint configurations for multiple candidate values for the underconstrained value of the target pose.

7. The method of claim 1, wherein the non-functional joints are joints of a base of a robotic arm attached to the tool, and wherein the functional joints are joints of the robotic arm.

8. A computing system comprising:
one or more computers; and
one or more storage devices storing instructions that, when executed by the one or more computers, cause the one or more computers to perform operations comprising:
identifying, by the computing system, a task to execute with a robotic system using a tool, wherein the robotic system comprises a plurality of components connected by non-functional joints and functional joints;
identifying a target pose to be obtained by the tool during execution of the task;
generating a plurality of partial joint configurations, each partial joint configuration including respective non-functional joint values for the plurality of non-functional joints;
generating a plurality of complete joint configurations for each partial joint configuration of the plurality of partial joint configurations, including generating, for each partial joint configuration, a plurality of functional joint values for the functional joints that cause the tool to attain the target pose when the non-functional joints are fixed according to the corresponding partial joint configuration;
evaluating, by the computing system, the plurality of complete joint configurations with respect to one or more task execution criteria to select a complete joint configuration;
and
directing, by the computing system, the robotic system to execute the task, including positioning the tool at the target pose according to the selected complete joint configuration.

9. The system of claim 8, wherein the operations further comprise:
evaluating each complete joint configuration according to a collision checking process to compute a likelihood that execution of the task according to the complete joint configuration will result in a collision with one or more components of the robotic system.

10. The system of claim 8, wherein positioning the tool at the target pose comprises:
performing a first movement of the non-functional joints according to non-functional joint values of a particular partial joint configuration; and
performing a second movement of the functional joints according to functional joint values of the selected complete joint configuration.

11. The system of claim 10, wherein performing the second movement of the functional joints comprises holding the non-functional joints fixed after performing the first movement.

12. The system of claim 8, wherein the operations further comprise:
generating a plurality of sets of complete joint configurations for each of a plurality of control points; and
evaluating a plurality of paths through respective complete joint configurations for the plurality of control points including counting how many control points are reachable from a same set of non-functional joint values.

13. The system of claim 8, wherein the target pose has an underconstrained value, and wherein generating the plurality of complete joint configurations comprises generating complete joint configurations for multiple candidate values for the underconstrained value of the target pose.

14. The system of claim 8, wherein the non-functional joints are joints of a base of a robotic arm attached to the tool, and wherein the functional joints are joints of the robotic arm.

15. One or more non-transitory computer-readable storage media encoded with computer program instructions that, when executed by a computing system comprising one or more computers, cause the one or more computers to perform operations comprising:
- identifying, by the computing system, a task to execute with a robotic system using a tool, wherein the robotic system comprises a plurality of components connected by non-functional joints and functional joints;
- identifying a target pose to be obtained by the tool during execution of the task;
- generating a plurality of partial joint configurations, each partial joint configuration including respective non-functional joint values for the plurality of non-functional joints;
- generating a plurality of complete joint configurations for each partial joint configuration of the plurality of partial joint configurations, including generating, for each partial joint configuration, a plurality of functional joint values for the functional joints that cause the tool to attain the target pose when the non-functional joints are fixed according to the corresponding partial joint configuration;
- evaluating, by the computing system, the plurality of complete joint configurations with respect to one or more task execution criteria to select a complete joint configuration;
- directing, by the computing system, the robotic system to execute the task, including positioning the tool at the target pose according to the selected complete joint configuration.

16. The one or more computer-readable storage media of claim 15, wherein positioning the tool at the target pose comprises:
- performing a first movement of the non-functional joints according to non-functional joint values of a particular partial joint configuration; and
- performing a second movement of the functional joints according to functional joint values of the selected complete joint configuration.

17. The one or more computer-readable storage media of claim 16, wherein performing the second movement of the functional joints comprises holding the non-functional joints fixed after performing the first movement.

18. The one or more computer-readable storage media of claim 15, wherein the operations further comprise:
- generating a plurality of sets of complete joint configurations for each of a plurality of control points; and
- evaluating a plurality of paths through respective complete joint configurations for the plurality of control points including counting how many control points are reachable from a same set of non-functional joint values.

19. The one or more computer-readable storage media of claim 15, wherein the target pose has an underconstrained value, and wherein generating the plurality of complete joint configurations comprises generating complete joint configurations for multiple candidate values for the underconstrained value of the target pose.

20. The one or more computer-readable media of claim 15, wherein the non-functional joints are joints of a base of a robotic arm attached to the tool, and wherein the functional joints are joints of the robotic arm.

* * * * *